US012769510B2

(12) United States Patent
Mombers

(10) Patent No.: US 12,769,510 B2
(45) Date of Patent: Oct. 20, 2026

(54) HARDWARE ACCELERATOR FOR FLOATING-POINT OPERATIONS

(71) Applicant: Avago Technologies International Sales Pte. Limited., Singapore (SG)

(72) Inventor: Friederich Mombers, San Jose, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 1118 days.

(21) Appl. No.: 17/877,793

(22) Filed: Jul. 29, 2022

(65) Prior Publication Data

US 2024/0036823 A1 Feb. 1, 2024

(51) Int. Cl.

*G06F 7/499* (2006.01)
*G06F 1/03* (2006.01)
*G06F 7/544* (2006.01)
*G06F 17/17* (2006.01)

(52) U.S. Cl.

CPC ............ *G06F 7/49915* (2013.01); *G06F 1/03* (2013.01); *G06F 7/544* (2013.01); *G06F 17/17* (2013.01)

(58) Field of Classification Search

CPC ...... G06F 7/483; G06F 7/49915; G06F 7/544; G06F 7/57; G06F 9/3001; G06F 17/10; G06F 17/17; G06F 1/03

See application file for complete search history.

(56) References Cited

U.S. PATENT DOCUMENTS 11,106,430 B1 8/2021 Kadkol et al.
2019/0384575 A1* 12/2019 Hickmann ................ G06F 1/03
2022/0229871 A1* 7/2022 Mangnall ............... G06N 3/063
2023/0161554 A1* 5/2023 Xi ........................... G06F 7/483 708/502

FOREIGN PATENT DOCUMENTS

EP 0889386 A2 1/1999

OTHER PUBLICATIONS

Extended European Search Report, Application No. 23174317.0, Dec. 22, 2023.
Oriol Vinyals and Gerald Friedland, "A Hardware-independent Fast Algorithm Approximation with Adjustable Accuracy," Tenth IEEE International Syposium on Multimedia, Dec. 15, 2008, pp. 61-65.
Suganth Paul et al., "A Fast Hardware Approach for Approximate, Efficient Logarithm and Antilogarithm Computations," IEEE Transactions on Very Large Scale Integration (VLSI) Systems, vol. 17, No. 2, Feb. 2009, pp. 269-277.

* cited by examiner

*Primary Examiner* — James Trujillo
*Assistant Examiner* — Maria De Jesus Rivera
(74) *Attorney, Agent, or Firm* — King Intellectual Asset Management

(57) ABSTRACT

A device includes a memory storing a first lookup table of entries each comprising a starting index value and a number of samples corresponding to a respective segment of a function and a second lookup table of entries each comprising a respective sampled mantissa from the function. An interpolation logic circuit retrieves from the first lookup table a starting index value and a number of samples corresponding to a segment of the function corresponding to an input mantissa from an input floating-point element, retrieves from the second lookup table a first sampled mantissa and a second sampled mantissa based on the starting index value and the number of samples retrieved from the first lookup table and the input mantissa, and interpolates an output mantissa.

20 Claims, 5 Drawing Sheets

SEGMENT PROPERTY TABLE

| | | | |
|---|---|---|---|
| 000 | $START_{000}$ | $NBITS_{000}$ | $SCALE_{000}$ |
| 001 | $START_{001}$ | $NBITS_{001}$ | $SCALE_{001}$ |
| 010 | $START_{010}$ | $NBITS_{010}$ | $SCALE_{010}$ |
| 011 | $START_{011}$ | $NBITS_{011}$ | $SCALE_{011}$ |
| 100 | $START_{100}$ | $NBITS_{100}$ | $SCALE_{100}$ |
| 101 | $START_{101}$ | $NBITS_{101}$ | $SCALE_{101}$ |
| 110 | $START_{110}$ | $NBITS_{110}$ | $SCALE_{110}$ |
| 111 | $START_{111}$ | $NBITS_{111}$ | $SCALE_{111}$ |

MANTISSA SAMPLE TABLE

| | | |
|---|---|---|
| IND 0 | NUDGE 0 | OUTPUT MANTISSA 0 |
| IND 1 | NUDGE 1 | OUTPUT MANTISSA 1 |
| IND 2 | NUDGE 2 | OUTPUT MANTISSA 2 |
| IND 3 | NUDGE 3 | OUTPUT MANTISSA 3 |
| IND 4 | NUDGE 4 | OUTPUT MANTISSA 4 |
| IND 5 | NUDGE 5 | OUTPUT MANTISSA 5 |
| . . . | . . . | . . . |
| IND N-1 | NUDGE N-1 | OUTPUT MANTISSA N-1 |

HARDWARE ACCELERATOR FOR FLOATING-POINT OPERATIONS

TECHNICAL FIELD

The present description relates generally to hardware acceleration including, for example, hardware acceleration for machine learning operations.

BACKGROUND

Machine learning operations performed in layers of a machine learning model are good candidates for hardware acceleration. Machine learning operations are often performed using floating-point data formats to cover large dynamic ranges of values. However, hardware accelerators configured to perform machine learning operations in floating-point format can be expensive in terms of required circuitry and/or processing times.

BRIEF DESCRIPTION OF THE DRAWINGS

Certain features of the subject technology are set forth in the appended claims. However, for purposes of explanation, several aspects of the subject technology are depicted in the following figures.

DETAILED DESCRIPTION

Figure 1:
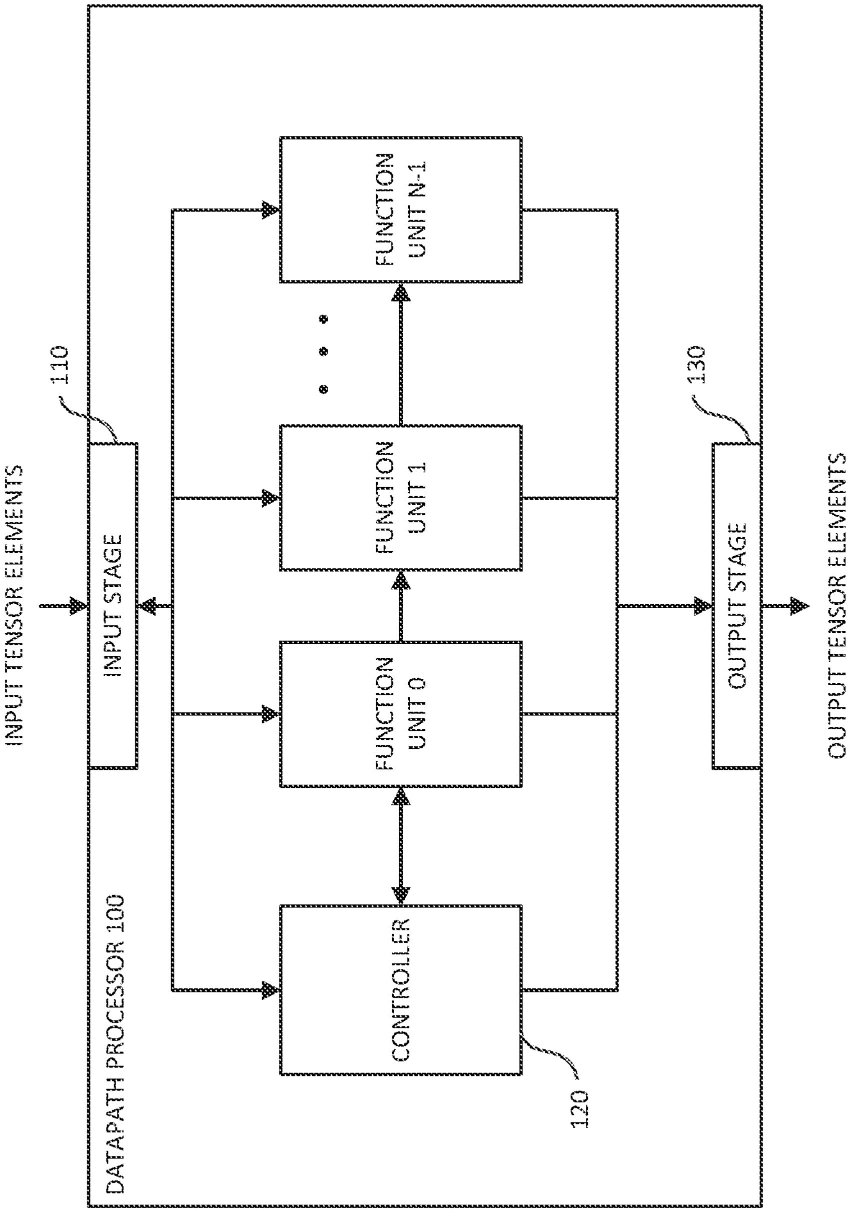
FIG. 1 is a block diagram depicting components of a programmable datapath processor device according to aspects of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block-diagram form in order to avoid obscuring the concepts of the subject technology.

Machine learning models often include multiple layers each configured to perform various machine learning operations on tensor elements. Tensors may be single-dimensional or multidimensional arrays of data elements. For example, a tensor may be visualized as a three-dimensional array of data elements, where each data element of the array is indexed using the three dimensions and has a corresponding value. The data elements or tensor data may include features, weights, activations, etc. processed in different layers of a machine learning model. The processing may involve complex non-linear functions such as logarithm (LOG), invert (INV), hyperbolic tangent (TANH), square root (SQRT), etc. executed on elements represented in a floating-point format such as FP32.

The subject technology provides efficient designs for a datapath processor of a hardware accelerator that is programmable to process tensor elements in a floating-point format using non-linear functions. The subject technology simplifies the hardware design and reduces the processing times relative to a conventional datapath processor by separating the processing of the exponent in the floating-point data format from the processing of the mantissa in the floating-point data format. For a non-linear function, the exponent may be solved using standard arithmetic operations. For example, the exponent is negated for an invert function, divided by two for a square root function, set to zero for a hyperbolic tangent function (hyperbolic tangent value is between −1 and 1), etc. These operations can be performed using a hardware arithmetic logic unit.

With respect to the mantissa of the floating-point data format, the subject technology takes advantage of machine learning accuracy requirements (e.g., 1e−6 relative precision) that are typically lower than accuracy requirements for other systems that may be required to comply with Institute of Electrical and Electronics Engineers (IEEE) standards to provide a lookup table and interpolation approach to solving for the mantissa. A lookup table may include an array of entries stored in memory where each entry includes one or more items of data. The array of entries may be indexed so that each entry has an associated index value that may be used to locate the entry within the array of entries and in memory to retrieve the one or more data items in the entry. According to aspects of the subject technology, the input mantissa from an input floating-point element may be used to index into lookup tables and the values retrieved from the lookup tables may be used to interpolate the output mantissa for the output floating-point element. This approach allows variation in hardware designs that balance the amount of memory needed to store the lookup tables, which is dependent on the sampling rate of the non-linear function used to populate the lookup tables, with the precision of the interpolation, which also is dependent on the sampling rate of the non-linear function used to populate the lookup tables. The foregoing features and aspects of the subject technology are described in additional detail below.

FIG. 1 is a block diagram depicting components of a programmable datapath processor device according to aspects of the subject technology. Not all of the depicted components may be required, however, and one or more implementations may include additional components not shown in the figure. Variations in the arrangement and type of the components may be made without departing from the spirit or scope of the claims as set forth herein. Depicted or described connections and couplings between components are not limited to direct connections or direct couplings and may be implemented with one or more intervening components unless expressly stated otherwise.

As depicted in FIG. 1, datapath processor 100 includes input stage 110, controller 120, output stage 130, and function units 0 through N−1. The components of datapath processor 100 may be implemented in a single semiconductor device, such as a system on a chip (SoC). Alternatively, one or more of the components of datapath processor 100 may be implemented in a semiconductor device separate from the other components and mounted on a printed circuit board, for example, with the other components to form a system. The subject technology is not limited to these two alternatives and may be implemented using other combinations of chips, devices, packaging, etc. to implement datapath processor 100.

According to aspects of the subject technology, input stage 110 includes suitable logic, circuitry, and/or code to implement an input interface between datapath processor 100 and other components of a hardware accelerator incorporating datapath processor 100. Input stage 110 may include one or more buffers configured to temporarily store received data until the data is distributed to other components of datapath processor 100. The buffers may include multiple banks of memory. Input stage 110 also may include flow control logic, circuitry, and/or code configured to exchange status and control signals with other components of the hardware accelerator to control the flow of data into datapath processor 100. The data may include instructions, code, configuration parameters, lookup table entries, input tensor elements, etc.

According to aspects of the subject technology, controller 120 includes suitable logic, circuitry, and/or code to program, monitor, and/or control components of datapath processor 100. For example, controller 120 may receive instructions and/or code from a scheduler unit of the hardware accelerator to configure components of datapath processor 100 to apply a non-linear function to a set of input tensor elements. In this regard, controller 120 may be configured to provide configuration instructions and/or parameters to one or more of function unit 0, function unit 1, . . . function unit N−1 to configure the logic and circuitry of the function units to implement the lookup and interpolation processes described herein for a non-linear function. In addition, controller 120 may be configured to load lookup table entries corresponding to the non-linear function into the function units to be used for the lookup and interpolation processes. The subject technology is not limited to any particular functions and may be implemented for any function suitable for the lookup and interpolation processes described herein (e.g., LOG, INV, TANH, SQRT, etc.). The subject technology also is not limited to any particular number of function units (e.g., 4, 8, 32) and the function units all may be configured for the same non-linear function to enable parallel processing of the input tensor elements, or the function units may be configured for different combinations of functions. The function units are described in further detail below.

According to aspects of the subject technology, output stage 130 includes suitable logic, circuitry, and/or code to implement an output interface between datapath processor 100 and other components of the hardware accelerator incorporating datapath processor 100. Output stage 130 may include one or more buffers configured to temporarily store data, such as output floating-point elements generated by the function units, until the data is transferred to another component of the hardware accelerator. The buffers may include multiple banks of memory. Output stage 130 also may include flow control logic, circuitry, and/or code configured to exchange status and control signals with other components of the hardware accelerator to control the flow of data out of datapath processor 100.

Figure 2:
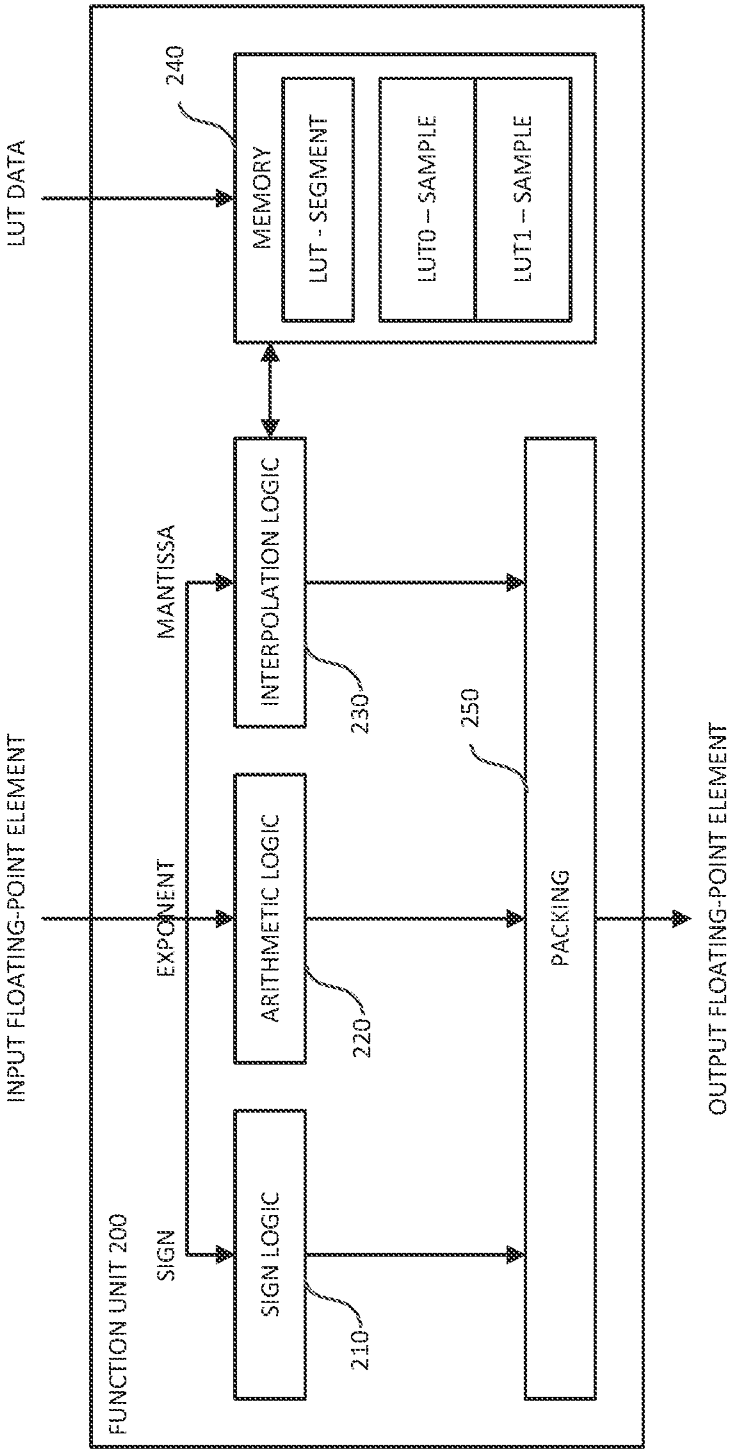
FIG. 2 is a block diagram illustrating components of a function unit according to aspects of the subject technology.

FIG. 2 is a block diagram illustrating components of a function unit according to aspects of the subject technology. Not all of the depicted components may be required, however, and one or more implementations may include additional components not shown in the figure. Variations in the arrangement and type of the components may be made without departing from the spirit or scope of the claims as set forth herein. Depicted or described connections and couplings between components are not limited to direct connections or direct couplings and may be implemented with one or more intervening components unless expressly stated otherwise.

As depicted in FIG. 2, function unit 200 includes sign logic circuit 210, arithmetic logic circuit 220, interpolation logic circuit 230, memory 240, and packing circuit 250. Function unit 200 is intended to represent any one of function units 0 to N−1 depicted in FIG. 1. The components of function unit 200 may be implemented in a single semiconductor device, such as a system on a chip (SoC). Alternatively, one or more of the components of function unit 200 may be implemented in a semiconductor device separate from the other components and mounted on a printed circuit board, for example, with the other components to form a system. The subject technology is not limited to these two alternatives and may be implemented using other combinations of chips, devices, packaging, etc. to implement function unit 200.

According to aspects of the subject technology, function unit 200 may be configured to receive an input floating-point element in a data format such as FP32, which includes one sign bit (S[1]), eight exponent bits (E[7:0]), and 23 mantissa bits (M[22:0]). As noted above, the controller may provide configuration instructions and/or parameters to the function unit to configure the function unit to execute a particular function on the received input floating-point element and generate an output floating-point element. In this regard, each of sign logic circuit 210, arithmetic logic circuit 220, and interpolation logic circuit 230 is configured based on the configuration instructions and/or parameters to perform operations on its respective portion of the input floating-point element (e.g., S[1], E[7:0], M[22:0]) to generate the output floating-point element according to the function.

According to aspects of the subject technology, sign logic circuit 210 includes suitable logic, circuitry, and/or code that is configurable to perform a sequence of one or more operations on the input sign, S[1], based on the function to generate an output sign. The sequence of one or more operations may pass S[1] through unchanged for functions such as invert (INVRT) and hyperbolic tangent (TAN H); may flip S[1] for functions such as sine (SIN) depending on the value of the input floating-point element (i.e., where the value lies in the [−Pi,Pi] range); or may signal that the output floating-point element should indicate the result is not a number (NaN) based on negative sign bits being applied to functions such as square root (SQRT) or logarithm (LOG).

According to aspects of the subject technology, arithmetic logic circuit 220 includes suitable logic, circuitry, and/or code that is configurable to perform a sequence of one or more operations on the input exponent, E[7:0], based on the function to generate an output exponent. For example, the sequence of one or more operations may negate the input exponent for an invert function (INVRT), divide the input exponent by two for a square root function (SQRT) (if the input exponent is an odd number, increment the input exponent by one before dividing by two and shifting the input mantissa to the left by one bit position before interpolation), set the input exponent to zero for a hyperbolic tangent function (TANH), etc. to generate the output exponent.

According to aspects of the subject technology, interpolation logic circuit 230 includes suitable logic, circuitry, and/or code that is configurable to perform a sequence of one or more operations on the input mantissa, M[22:0], based on the function to generate an output mantissa. The generated output mantissa is an estimate that is generated using the input mantissa to index lookup tables stored in memory 240, retrieve samples for the function and other information from the lookup tables, and interpolate the output mantissa using the retrieved samples and other information. This lookup and interpolate process is described in further detail below.

According to aspects of the subject technology, memory 240 includes multiple bank arrays of random-access memory (RAM). The subject technology is not limited to any particular size or type of RAM, however, the size and layout of the function unit and/or the datapath processor may limit the amount of RAM that can be included in the function unit. Memory 240 is configured to receive and store lookup table entries from the controller for a particular function. In particular, the controller loads the lookup table entries for a segment property table (LUT-SEGMENT) into one bank array and the lookup table entries for a mantissa sample table into two bank arrays configured to provide concurrent read accesses to two successive addresses in the mantissa sample table. The contents and use of these tables by interpolation logic circuit 230 is described in more detail below.

Figures 3A, 3B:
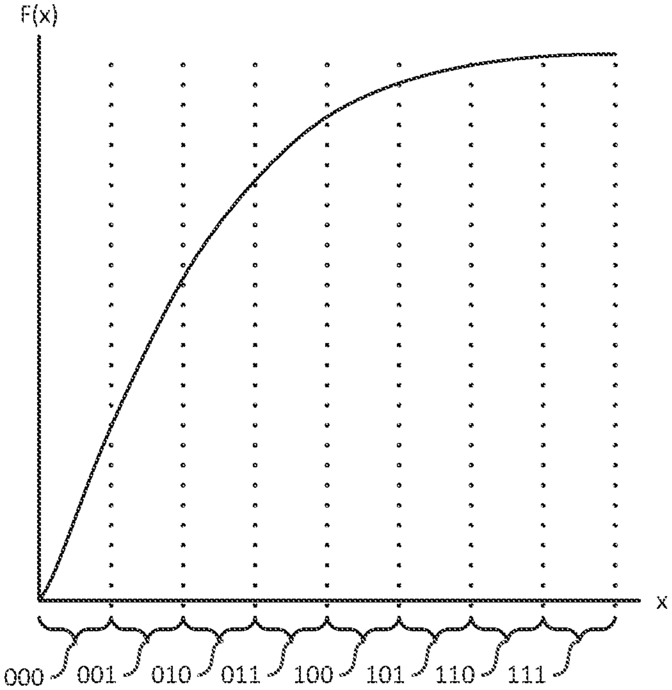
FIG. 3A is a graph illustrating segments of a function according to aspects of the subject technology and FIG. 3B illustrates the organization and contents of a segment property table according to aspects of the subject technology.

FIG. 3A is a graph illustrating segments of a function according to aspects of the subject technology and FIG. 3B illustrates the organization and contents of a segment property table according to aspects of the subject technology. The graph in FIG. 3A illustrates a non-linear function F(x) where x is the input mantissa and F(x) is the output mantissa. Rather than fully populating a lookup table with entries for all possible input mantissas (2×23 entries), the subject technology reduces the memory requirements by utilizing a reduced set of input/output samples and determines missing samples using an interpolation process.

According to aspects of the subject technology, the function may be divided into segments, where each segment includes a range of input mantissas and the corresponding range of output mantissas. In the example depicted in FIG. 3A, the function is divided into eight segments having the same size. With this arrangement, the individual segments can be indexed or identified using the three most significant bits of the input mantissa (M[22:20]). The subject technology is not limited to using eight segments. For example, the function may be divided into sixteen segments and the four most significant bits of the input mantissa (M[22:19]) may be used for indexing or identification. Other numbers of segments may be used, but numbers that are a power of two simplify the indexing of the segments.

As noted above, a reduced sample set may be used to reduce the memory requirements for the lookup table. For example, a uniform distribution of input/output samples may be used across the segments of the function (e.g., each segment includes 16 input/output samples mapping an input mantissa to an output mantissa). However, the precision of the interpolation process may be improved by using a non-uniform distribution of input/output samples across the segments. For example, more input/output samples may be taken in segments with a larger range of output mantissa values (e.g., segments 000, 001, 010, 011) than in segments with a smaller range of output mantissa values (e.g., segments 111, 110, 101). For example, segment 000 may be allocated 64 input/output samples and segment 111 may be allocated four input/output samples. The subject technology is not limited to any particular total number of input/output samples or any particular distribution of input/output samples across the segments. While any number of samples may be allocated to a segment, allocating samples in powers of two simplifies other aspects of the subject technology.

The segment property table represented in FIG. 3B includes entries containing data used to index into the mantissa sample table. The segment property table may be indexed using the most significant bits of the input mantissa corresponding to the segments of the function. Each lookup table entry includes an index value in the mantissa sample table for the first input/output sample in the respective segment (e.g., $START_{000}$) and the number of bits corresponding to the total number of samples in the segment (e.g., $NBITS_{000}$). Each entry of the segment property table also may include a scale factor (e.g., $SCALE_{000}$) used in the interpolation process described below.

Figures 4, 6:
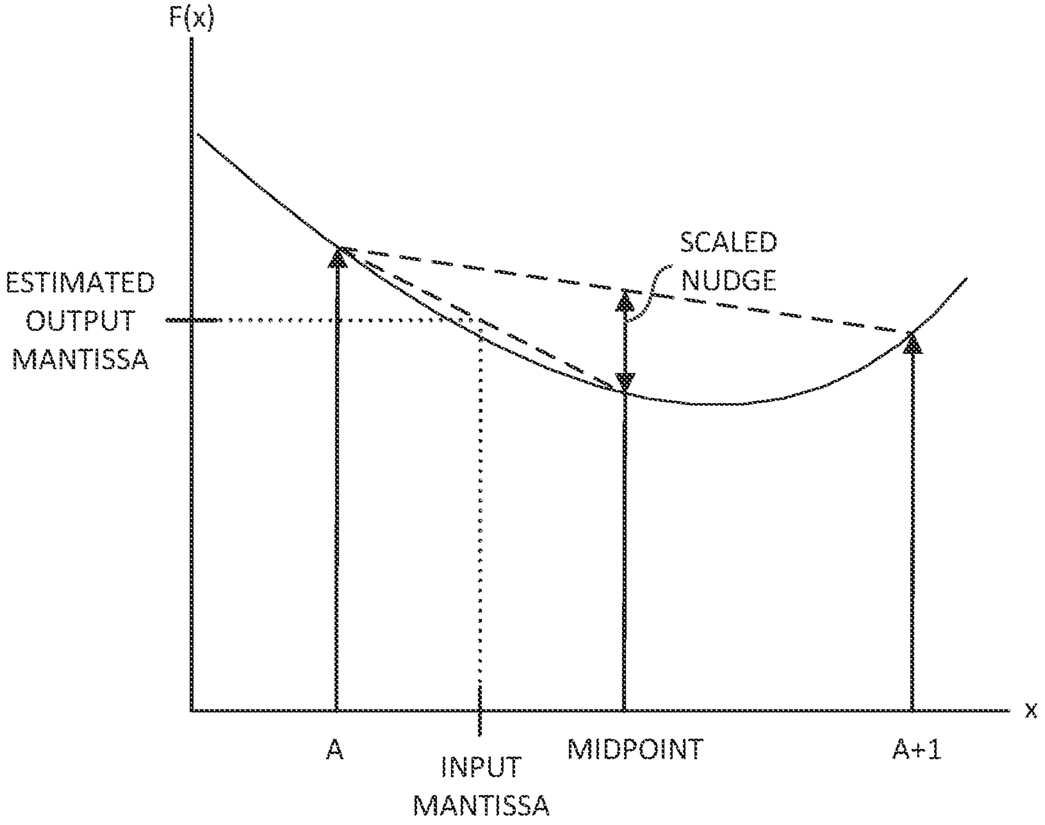
FIG. 4 illustrates the organization and contents of a mantissa sample table according to aspects of the subject technology.
FIG. 6 is a graph illustrating an interpolation process according to aspects of the subject technology.

FIG. 4 illustrates the organization and contents of a mantissa sample table according to aspects of the subject technology. The entries of the mantissa sample table may be indexed based on the input mantissa and information retrieved from the segment property table. For example, the input mantissa may be used to identify the segment of the function containing the input mantissa and index into the segment property table to retrieve the index value of the first input/output sample corresponding to that segment (START) and the number of bits corresponding to the number of samples available in that segment (NBITS). In an example where a function has been divided into sixteen segments, the four most significant bits of the input mantissa (M[22:19]) are used to identify the segment of the function containing the input mantissa and index into the segment property table to determine the START index value and the NBITS. The index values of the two input/output samples between which the input mantissa lies (A and A+1) are determined by adding M[18:18–NBITS+1] to the START index value for the A index value and then incrementing by one for the A+1 index value.

According to aspects of the subject technology, each entry of the mantissa sample table includes an output mantissa value corresponding to an input mantissa value of the input/output sample associated with the index value of the table entry. For the FP32 floating-point data format, the output mantissa comprises 23 bits. According to aspects of the subject technology, data is read out of the memory in 32-bit units. The subject technology takes advantage of the extra nine bits available in the table entry read out of the memory by including a signed nine-bit nudge factor in the table entry with the output mantissa. The nudge factor is used in the interpolation process discussed in more detail below.

Figure 5:
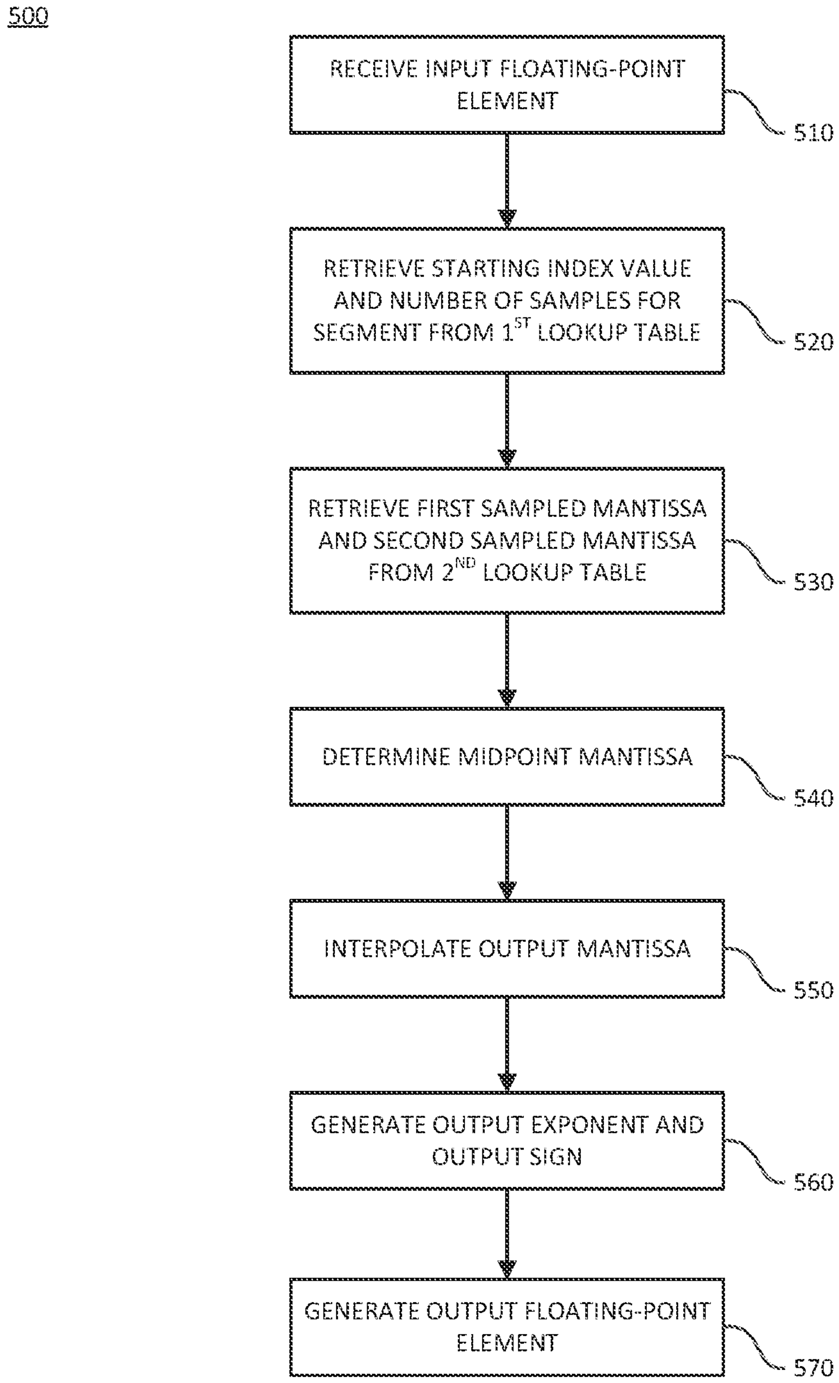
FIG. 5 is a flowchart illustrating a lookup and interpolate process for estimating an output floating-point element according to aspects of the subject technology.

FIG. 5 is a flowchart illustrating a lookup and interpolate process for estimating an output floating-point element according to aspects of the subject technology. For explanatory purposes, the blocks of the process 500 are described herein as occurring in serial, or linearly. However, multiple blocks of the process 500 may occur in parallel. In addition, the blocks of the process 500 need not be performed in the order shown and/or one or more blocks of the process 500 need not be performed and/or can be replaced by other operations. FIG. 6 is a graph illustrating a lookup and interpolation process according to aspects of the subject technology. Process 500 from FIG. 5 will be described with reference to the graph in FIG. 6.

According to aspects of the subject technology, process 500 begins with a function unit, which has been configured by the controller for a non-linear function, receiving an input floating-point element for processing (block 510). The interpolation logic circuit is configured to index into the segment property table using the input mantissa of the input floating-point element (e.g., M[22:19]) to retrieve the starting index value (START) and the number of bits (NBITS) corresponding to the samples available in the segment of the non-linear function containing the input mantissa (block 520). The interpolation logic circuit is further configured to determine index values for entries in the mantissa sample table corresponding to the two sampled mantissas between which the input mantissa lies (A=START+M[18:18−NBITS+1] and A+1) and retrieve the sampled output mantissas from LUT [A] and LUT[A+1] (block 530). As noted above, the table entries for the sample mantissa may be distributed between two bank arrays of memory to allow the consecutive table entries for A and A+1 to be retrieved concurrently.

Referring to FIG. 6, the graph depicts the sampled input mantissas at A and A+1 and the corresponding sampled output mantissas along the function F(x). According to aspects of the subject technology, a midpoint mantissa is determined between the sampled input/output mantissas corresponding to A and A+1 (block 540). The interpolation logic circuit may be configured to determine the midpoint mantissa by identifying the midpoint on a line connecting the two sampled output mantissas and adjusting the midpoint based on the product of the nudge factor from the table entry retrieved from the mantissa sample table and the scale factor from the table entry retrieved from the segment property table (e.g., midpoint mantissa=(LUT[A]+LUT[A+1])/2+(nudge factor*scale factor)). The adjustment brings the midpoint mantissa in alignment with the curve representing the function F(x). Determining the midpoint mantissa in this manner effectively doubles the sampling rate within each segment and improves the precision of the interpolation process without increasing the number of table entries in the mantissa sample table.

The interpolation logic circuit may be configured further to linearly interpolate an estimate of the output mantissa generated from the input mantissa by the function using the sampled mantissas corresponding to A, A+1, and the midpoint mantissa (block 550). According to aspects of the subject technology, the midpoint mantissa creates two sets of starting points and ending points with the sampled output mantissas for A and A+1. Accordingly, the linear interpolation may be performed for either the starting/ending points [A, midpoint] or [midpoint, A+1]. The starting/ending points to be used for the interpolation may be based on a bit in the input mantissa (M[18−NBITS]). In the example depicted in FIG. 6, the [A, midpoint] starting/ending points are selected for the linear interpolation of the estimated output mantissa.

According to aspects of the subject technology, the estimated output mantissa is interpolated using a fractional portion of the input mantissa (e.g., M[18−NBITS−1:0]). For example, the estimated output mantissa may equal the sampled output mantissa for A plus the difference between the determined midpoint mantissa and the sampled output mantissa for A times the fractional portion of the input mantissa (output=LUT[A]+(Midpoint−LUT[A])*M[18−NBITS−1:0]).

The interpolation logic circuit may be configured to provide the estimated output mantissa to the packing circuit. Similarly, the sign logic circuit may generate an output sign based on the input sign and the function, and the arithmetic logic circuit may generate an output exponent based on the input exponent and the function (block 560) as described above. The sign logic circuit and the arithmetic logic circuit may be configured to provide the output sign and the output exponent to the packing circuit to generate an estimated output floating-point unit comprising the output sign, the output exponent, and the estimated output mantissa (block 570).

According to aspects of the subject technology, packing circuit 250 depicted in FIG. 2 includes suitable logic, circuitry, and/or code that is configurable to generate the estimated output floating-point element by packing the received output sign, output exponent, and estimated output mantissa into the floating-point data format. Packing circuit 250 may be configured further to normalize the estimated output mantissa if needed. For example, if the most significant bit of the output mantissa is not a "1", the output mantissa may be shifted to put a "1" into the most significant bit position and the output exponent may be updated to account for the shift in the output mantissa. The estimated output mantissa may be provided by packing circuit 250 to the output stage of the datapath processor to be transferred to another component in the hardware accelerator.

According to aspects of the subject technology, a device is provided that includes a memory configured to store a first lookup table of entries each comprising a starting index value and a number of samples corresponding to a respective segment of a function and a second lookup table of entries each comprising a respective sampled mantissa from the function and an interpolation logic circuit configured to retrieve from the first lookup table a starting index value and a number of samples corresponding to a segment of the function corresponding to an input mantissa from an input floating-point element, retrieve from the second lookup table a first sampled mantissa and a second sampled mantissa based on the starting index value and the number of samples retrieved from the first lookup table and the input mantissa, and interpolate an output mantissa based on the first sampled mantissa, the second sampled mantissa, and the input mantissa. The device further includes an arithmetic logic circuit configured to perform an operation on an input exponent from the input floating-point element based on the function to generate an output exponent, a sign logic circuit configured to perform an operation on an input sign from the input floating-point element based on the function to generate an output sign, and a packing circuit configured to generate an output floating-point element comprising the output sign, the output exponent, and the output mantissa.

The function may be a non-linear function. The entries of the second lookup table each may further comprise a respective first factor, and the interpolation logic circuit may be further configured to determine a midpoint mantissa between the first sampled mantissa and the second sampled mantissa, and adjust the determined midpoint mantissa based on the first factor, wherein the output mantissa is interpolated between the first sampled mantissa and the adjusted midpoint mantissa or between the adjusted midpoint mantissa and the second sampled mantissa based on the input mantissa.

Each of the entries of the first lookup table may further comprise a second factor, and the interpolation circuit may be further configured to multiply the first factor by the second factor and adjust the midpoint mantissa based on the product. The interpolation logic circuit may be configured to interpolate the output mantissa using linear interpolation.

The memory may include two banks of random-access memory, where the entries of the second lookup table may be divided between the two banks, and the interpolation logic circuit may be further configured to retrieve the first sampled mantissa from a first bank of the two banks and retrieve the second sampled mantissa from a second bank of the two banks. The interpolation logic circuit may be configured to retrieve the first sampled mantissa from the first bank and retrieve the second sampled mantissa from the second bank in parallel. The number of samples corresponding to a first segment of the non-linear function may be greater than the number of samples corresponding to a second segment of the non-linear function. The packing circuit may be further configured to normalize the output mantissa.

According to aspects of the subject technology, a device is provided that includes a function unit, a controller configured to load a plurality of lookup table entries into the function unit and to configure the function unit for a non-linear function, an input stage configured to receive an input floating-point element and provide the input floating-point element to the function unit, and an output stage configured to receive an output floating-point element from the function unit and buffer the output floating-point element for transfer out of the device. The function unit is configured to interpolate an output mantissa based on an input mantissa of the input floating-point element and first and second sampled mantissas sampled from the non-linear function and retrieved from the lookup table entries, generate an output exponent based on an input exponent of the input floating-point element and the non-linear function, generate an output sign based on an input sign of the input floating-point element and the non-linear function, and generate the output floating-point element comprising the output sign, the output exponent, and the output mantissa.

The plurality of lookup table entries may comprise a first lookup table and a second lookup table, and the function unit may be further configured to retrieve from the first lookup table a starting index value and a number of samples corresponding to a segment of the non-linear function corresponding to the input mantissa, and retrieve from the second lookup table the first sampled mantissa and the second sampled mantissa based on the starting index value and the number of samples retrieved from the first lookup table and the input mantissa.

The function unit may be further configured to determine a midpoint mantissa between the first sampled mantissa and the second sampled mantissa, and adjust the midpoint mantissa based on a first factor retrieved from the second lookup table, wherein the output mantissa may be interpolated between the first sampled mantissa and the adjusted midpoint mantissa or between the adjusted midpoint mantissa and the second sampled mantissa based on the input mantissa. The function unit may be further configured to multiply the first factor by the second factor and adjust the midpoint mantissa based on the product. The function unit may be further configured to interpolate the output mantissa using linear interpolation.

The function unit may include two banks of random-access memory, wherein the lookup table entries of the second lookup table are divided between the two banks, and wherein the function unit is further configured to retrieve the first sampled mantissa from a first bank of the two banks and retrieve the second sampled mantissa from a second bank of the two banks. The function unit may be configured to retrieve the first sampled mantissa from the first bank and retrieve the second sampled mantissa from the second bank in parallel. A number of samples corresponding to a first segment of the non-linear function may be greater than a number of samples corresponding to a second segment of the non-linear function.

According to aspects of the subject technology, a method is provided that includes receiving an input floating-point element, retrieving from a first lookup table a starting index value and a number of samples from a segment of a non-linear function based on an input mantissa of the input floating-point element, retrieving from a second lookup table a first sampled mantissa and a second sampled mantissa based on the starting index value, the number of samples from the segment, and the input mantissa, linearly interpolating an output mantissa based on the first sampled mantissa, the second sampled mantissa, and the input mantissa, generating an output exponent based on an input exponent of the input floating-point element and the non-linear function, generating an output sign based on an input sign of the input floating-point element and the non-linear function, and generating an output floating-point element comprising the output sign, the output exponent, and the output mantissa.

The method may further include determining a midpoint mantissa between the first sampled mantissa and the second sampled mantissa, and adjusting the midpoint mantissa based on a first factor retrieved from the first lookup table and a second factor retrieved from the second lookup table, wherein the output mantissa may be linearly interpolated between the first sampled mantissa and the adjusted midpoint mantissa or between the adjusted midpoint mantissa and the second sampled mantissa based on the input mantissa. A number of samples from a first segment of the non-linear function may be greater than a number of samples from a second segment of the non-linear function.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but are to be accorded the full scope consistent with the language of the claims, wherein reference to an element in the singular is not intended to mean “one and only one” unless specifically so stated, but rather “one or more.” Unless specifically stated otherwise, the term “some” refers to one or more. Pronouns in the masculine (e.g., his) include the feminine and neuter gender (e.g., her and its) and vice versa. Headings and subheadings, if any, are used for convenience only and do not limit the subject disclosure.

The predicate words “configured to”, “operable to”, and “programmed to” do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an “aspect” does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a “configuration” does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word “example” is used herein to mean “serving as an example or illustration.” Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way), all without departing from the scope of the subject technology.

What is claimed is:

1. A device, comprising:

a memory configured to store a first lookup table of entries each comprising a starting index value and a number of samples corresponding to a respective segment of a function and a second lookup table of entries each comprising a respective sampled mantissa from the function;

an interpolation logic circuit configured to:

retrieve from the first lookup table a starting index value and a number of samples corresponding to a segment of the function corresponding to an input mantissa from an input floating-point element;

retrieve from the second lookup table a first sampled mantissa and a second sampled mantissa based on the starting index value and the number of samples retrieved from the first lookup table and the input mantissa; and interpolate an output mantissa based on the first sampled mantissa, the second sampled mantissa, and the input mantissa;

an arithmetic logic circuit configured to perform an operation on an input exponent from the input floating-point element based on the function to generate an output exponent;

a sign logic circuit configured to perform an operation on an input sign from the input floating-point element based on the function to generate an output sign; and a packing circuit configured to generate an output floating-point element comprising the output sign, the output exponent, and the output mantissa.

2. The device of claim 1, wherein the function is a non-linear function.

3. The device of claim 2, wherein the entries of the second lookup table each further comprise a respective first factor, and:

wherein the interpolation logic circuit is further configured to:

determine a midpoint mantissa between the first sampled mantissa and the second sampled mantissa; and adjust the determined midpoint mantissa based on the first factor;

wherein the output mantissa is interpolated between the first sampled mantissa and the adjusted midpoint mantissa or between the adjusted midpoint mantissa and the second sampled mantissa based on the input mantissa.

4. The device of claim 3, wherein each of the entries of the first lookup table further comprise a second factor, and:

wherein the interpolation logic circuit is further configured to multiply the first factor by the second factor and adjust the determined midpoint mantissa based on the product.

5. The device of claim 4, wherein the interpolation logic circuit is configured to interpolate the output mantissa using linear interpolation.

6. The device of claim 5, wherein:

the memory comprises two banks of random-access memory, the entries of the second lookup table are divided between the two banks; and the interpolation logic circuit is further configured to retrieve the first sampled mantissa from a first bank of the two banks and retrieve the second sampled mantissa from a second bank of the two banks.

7. The device of claim 6, wherein the interpolation logic circuit is configured to retrieve the first sampled mantissa from the first bank and retrieve the second sampled mantissa from the second bank in parallel.

8. The device of claim 7, wherein a number of samples corresponding to a first segment of the non-linear function is greater than a number of samples corresponding to a second segment of the non-linear function.

9. The device of claim 8, wherein the packing circuit is further configured to normalize the output mantissa.

10. A device, comprising:

a function unit;

a controller configured to load a plurality of lookup table entries comprising a first lookup table and a second lookup table into the function unit and to configure the function unit for a non-linear function;

an input stage comprising hardware circuitry and configured to receive an input floating-point element and provide the input floating-point element to the function unit; and an output stage comprising hardware circuitry and configured to receive an output floating-point element from the function unit and buffer the output floating-point element for transfer out of the device, wherein the function unit is configured to:

retrieve from the first lookup table a starting index value and a number of samples corresponding to a segment of the non-linear function corresponding to the input mantissa;

retrieve from the second lookup table a first sampled mantissa and a second sampled mantissa based on the starting index value and the number of samples retrieved from the first lookup table and the input mantissa;

interpolate an output mantissa based on an input mantissa of the input floating-point element and the first sampled mantissa and the second sampled mantissa;

generate an output exponent based on an input exponent of the input floating-point element and the non-linear function;

generate an output sign based on an input sign of the input floating-point element and the non-linear function; and generate the output floating-point element comprising the output sign, the output exponent, and the output mantissa.

11. The device of claim 10, wherein the function unit is further configured to:

determine a midpoint mantissa between the first sampled mantissa and the second sampled mantissa; and adjust the determined midpoint mantissa based on a first factor retrieved from the second lookup table, wherein the output mantissa is interpolated between the first sampled mantissa and the adjusted midpoint mantissa or between the adjusted midpoint mantissa and the second sampled mantissa based on the input mantissa.

12. The device of claim 11, wherein each entry of the first lookup table further comprises a second factor, and wherein the function unit is further configured to multiply the first factor by the second factor and adjust the determined midpoint mantissa based on the product.

13. The device of claim 12, wherein the function unit is further configured to interpolate the output mantissa using linear interpolation.

14. The device of claim 10, wherein the function unit comprises two banks of random-access memory, wherein the lookup table entries of the second lookup table are divided between the two banks, and:

wherein the function unit is further configured to retrieve the first sampled mantissa from a first bank of the two banks and retrieve the second sampled mantissa from a second bank of the two banks.

15. The device of claim 14, wherein the function unit is configured to retrieve the first sampled mantissa from the first bank and retrieve the second sampled mantissa from the second bank in parallel.

16. The device of claim 15, wherein a number of samples corresponding to a first segment of the non-linear function is greater than a number of samples corresponding to a second segment of the non-linear function.

17. The device of claim 16, wherein the function unit is further configured to normalize the output mantissa.

18. A method, comprising:

receiving an input floating-point element;

retrieving from a first lookup table a starting index value and a number of samples from a segment of a non-linear function based on an input mantissa of the input floating-point element;

retrieving from a second lookup table a first sampled mantissa and a second sampled mantissa based on the starting index value, the number of samples from the segment, and the input mantissa;

linearly interpolating an output mantissa based on the first sampled mantissa, the second sampled mantissa, and the input mantissa;

generating an output exponent based on an input exponent of the input floating-point element and the non-linear function;

generating an output sign based on an input sign of the input floating-point element and the non-linear function; and generating an output floating-point element comprising the output sign, the output exponent, and the output mantissa.

19. The method of claim 18, further comprising:

determining a midpoint mantissa between the first sampled mantissa and the second sampled mantissa; and adjusting the determined midpoint mantissa based on a first factor retrieved from the first lookup table and a second factor retrieved from the second lookup table, wherein the output mantissa is linearly interpolated between the first sampled mantissa and the adjusted midpoint mantissa or between the adjusted midpoint mantissa and the second sampled mantissa based on the input mantissa.

20. The method of claim 19, wherein a number of samples from a first segment of the non-linear function is greater than a number of samples from a second segment of the non-linear function.

* * * * *